United States Patent Office 3,343,597
Patented Sept. 26, 1967

3,343,597
PROTECTION OF MICELLAR SYSTEMS IN OIL
RECOVERY
William B. Gogarty and Russell W. Olson, Littleton,
Colo., assignors to Marathon Oil Company, Findlay,
Ohio, a corporation of Ohio
No Drawing. Filed Sept. 2, 1966, Ser. No. 576,863
9 Claims. (Cl. 166—9)

ABSTRACT OF THE DISCLOSURE

Micellar systems—such as the soluble oils, the water-containing soluble oils, microemulsions, and the opaque emulsions—are protected from the ions in formation water during secondary-type oil recovery by injecting an aqueous slug of controlled ion content into the formation prior to injection of the micellar dispersion.

---

This application is a continuation-in-part of our co-pending United States patent applications, Ser. No. 212,134, filed July 24, 1962, and Ser. No. 324,216 filed Nov. 18, 1963.

This invention relates to the recovery of petroleum crudes and more particularly to the injection of a slug of water into a formation prior to the injection of a micellar system to insulate the micellar system from the ions contained in the water of the formulation.

Micellar systems have been found to be useful in secondary oil recovery. Such systems are taught in United States Patents 3,149,669, 3,163,214, 3,208,517 and 3,254,714. Micellar systems include species such as the soluble oils, the water-containing soluble oils, microemulsions, and the opaque emulsions. Many micellar systems are potentially useful in the oil recovery processes described in these patents. However, many other systems cannot be readily used because of the tendency of these micellar systems to break down on contact with various ions in the formation waters.

Thus, where alkali metal soaps of fatty acids, for example, sodium stearate, are used in making up a micellar system, various multivalent ions, for example, iron, calcium, magnesium, aluminum, etc., will cause precipitation of the surfactant from water solution with a resulting breakdown of the micellar dispersion.

In the process of this invention, a slug of water of controlled ion content is interposed between the formation water and a later-injected micellar system.

The size of the slug of water required to insulate the injected micellar system from the ions in the formation is small. Normally, only about 0.1 to no more than about 10% and preferably from about 1 to about 3% pore volume water is injected to insulate the later-injected micellar slugs. The larger percentage water slugs are used in instances where the flooding pattern is small or where there is a large difference between the ion makeup of the water in the formation and that utilized to makeup the micellar system. Smaller percentages are used where the difference in ion content is small and where the pattern to be flooded is large.

The insulating water injected into the formation should have about the ion content of the water used to make micellar dispersions at the point where the insulating water slug and the micellar dispersion slug are in contact. Additionally, the makeup water should have an ion content which will not substantially adversely affect the micellar system surfactant content, the properties of the formaton or the electrical properties of the micellar system. The leading edge of the injected insulating slug need not be so nearly matched in ion makeup and concentration.

Small amounts of "tracer" ions, etc. can be incorporated in the injected water slug. The concentration of these tracers should be so low as to not materially affect the micellar dispersion stability or characteristics. The incorporation of tracer materials in the insulating water is not claimed.

The following specific example more clearly illustrates our invention. However, it is not intended that the invention be limited to the specific percentages of pore volume, insulating water slug compositions, etc. Rather, it is intended that equivalents obvious to those skilled in the art be included within the scope of the invention as claimed.

Example I

A flood is performed in a 2.5 acre five-spot pattern containing four injection wells and a central producing well. The reservoir within the pattern ranges from 8 to 11 feet in thickness and is at a depth of about 990 feet. A slug of water is injected into the formation comprising 4000 barrels of water containing 500 p.p.m. salts. A series of slugs are injected which comprise the primary displacing material and viscosity control slugs or materials. The slugs are labeled A, B, and C and are made up from a "stock" solution. The stock solution contains 5.0, 15.2, and 79.8%, respectively, of isopropanol, a petroleum sulfonate, and straight run gasoline. Slug A is oil-external and contains approximately 25% water. It has a viscosity approximately that of the crude in the formation, i.e., 11 centipoises. Slug B is water-external and contains about 60% water. It has a viscosity approximately that of slug A and is miscible with slug A. Slug C contains only slightly more water than slug B at its leading edge and almost 100% water at its trailing edge. The varying water concentration incrementally reduces the viscosity of the later-injected material to that of water which is used as a driver. The ion content of the makeup water is 2900 p.p.m. salts. Slug A comprises about 3.5%, slug B 3.8% and slug C 2.8% pore volume within the 2.5 acre pattern. Slug B was miscible with slug A and with water.

Injection is at the rate of about 150–600 barrels per day during the water injection, 525 barrels per day during the injection of the remaining slugs and 1200–4000 barrels per day of drive water. The flood is completed in about 20 months and more than twice the oil recoveries obtained in water flooding nearby similar formations is obtained.

Now having described our invention, what we claim is:
1. A process for the recovery of fluid petroleum from permeable subterranean formations having at least one injection means and one recovery means in communication with such formations, the steps comprising injecting into the said formation through said injection means a slug of insulating water, thereafter injecting into said formation a micellar system, displacing said slug of insulating water and micellar system towards a recovery means and recovering fluid petroleum displaced by said water and said micellar system.

2. Claim 2 is the process of claim 1 wherein the micellar system is a soluble oil.

3. The process of claim 1 wherein the micellar system is a water-containing soluble oil.

4. The process of claim 1 wherein the micellar system is a microemulsion.

5. The process of claim 1 wherein the micellar system is an opaque emulsion.

6. The process of claim 1 wherein the insulated slug contained up to about 3% of the pore volume water.

7. The process of claim 1 wherein the insulating slug contains from about 1 to about 3% of pore volume water.

8. The process of claim 1 wherein the ion content of the trailing edge of the insulating water slug is substantially that of any water in the micellar system.

9. A process for the recovery of fluid petroleum from permeable subterranean formations having at least one injection means and one recovery means in communication with such formations, the steps comprising injecting into the said formation through said injection means a slug of insulating water, thereafter injecting into said formation a microemulsion, displacing said slug of insulating water and microemulsion towards a recovery means and recovering fluid petroleum displaced by said water and said microemulsion.

References Cited
UNITED STATES PATENTS

| | | | |
|---|---|---|---|
| 3,135,325 | 6/1964 | Parker | 166—9 |
| 3,149,669 | 9/1964 | Binder et al. | 166—9 |
| 3,163,214 | 12/1964 | Csaszar | 166—9 |
| 3,170,514 | 2/1965 | Harvey et al. | 166—9 |
| 3,208,517 | 9/1965 | Binder et al. | 166—9 |
| 3,208,528 | 9/1965 | Elliott et al. | 166—9 X |
| 3,245,467 | 4/1966 | Fitch | 166—9 |

STEPHEN J. NOVOSAD, *Examiner.*

CHARLES E. O'CONNELL, *Primary Examiner.*

UNITED STATES PATENT OFFICE
CERTIFICATE OF CORRECTION

Patent No. 3,343,597  September 26, 1967

William B. Gogarty et al.

It is hereby certified that error appears in the above numbered patent requiring correction and that the said Letters Patent should read as corrected below.

Column 1, line 29, for "formulation" read -- formation --.

Signed and sealed this 12th day of November 1968.

(SEAL)
Attest:

Edward M. Fletcher, Jr.

Attesting Officer

EDWARD J. BRENNER

Commissioner of Patents